United States Patent [19]
Saegusa

[11] Patent Number: 5,600,389
[45] Date of Patent: Feb. 4, 1997

[54] CAMERA WHICH SETS SHUTTER SPEED AND LIGHTS DISPLAY IN ACCORDANCE WITH FLASH DEVICE

[75] Inventor: Takashi Saegusa, Kawasaki, Japan

[73] Assignee: Nikon Corporation, Tokyo, Japan

[21] Appl. No.: 497,234

[22] Filed: Jun. 30, 1995

[30] Foreign Application Priority Data

Sep. 7, 1994 [JP] Japan .................................. 6-213616
Sep. 7, 1994 [JP] Japan .................................. 6-213621

[51] Int. Cl.$^6$ ........................... G03B 15/05; G03B 17/00
[52] U.S. Cl. ...................... 396/166; 396/201; 396/176; 396/296
[58] Field of Search ............... 354/127.11, 132, 354/145.1, 149.11, 289.12, 420, 421, 422, 456, 458, 459, 418, 202, 70, 400, 430

[56] References Cited

U.S. PATENT DOCUMENTS

| | | | |
|---|---|---|---|
| 4,518,234 | 5/1985 | Kobayashi | 354/418 |
| 4,897,685 | 1/1990 | Nishida | 354/458 |
| 5,023,639 | 6/1991 | Ushiro et al. | 354/132 |
| 5,471,370 | 11/1995 | Takami | 354/149.11 |

Primary Examiner—A. A. Mathews

[57] ABSTRACT

A camera information setting device temporarily sets a shutter speed during flash photography. The original camera shutter speed is automatically recovered without further operation from the photographer. A first display is disposed within the viewfinder of the camera for displaying a warning if the camera shutter speed presents a risk of image blur due to camera shake and second display is disposed external to the camera for indicating that a flash device will limit the set shutter speed of the camera. The device cooperates with a removable flash device. A manual setting member performs a shutter speed setting which is then stored in a first memory unit. A first display unit and a second display perform display of the shutter speed. A change unit determines the presence or absence of the flash device, performs a change of the shutter speed and stores it to a second memory unit. When a change of the shutter speed is performed by the change unit, a shutter speed display is performed in the second display unit, based on the information stored in the second memory unit. A shutter speed display is also performed in the first display unit, based on the information which was stored in the first memory unit.

15 Claims, 4 Drawing Sheets

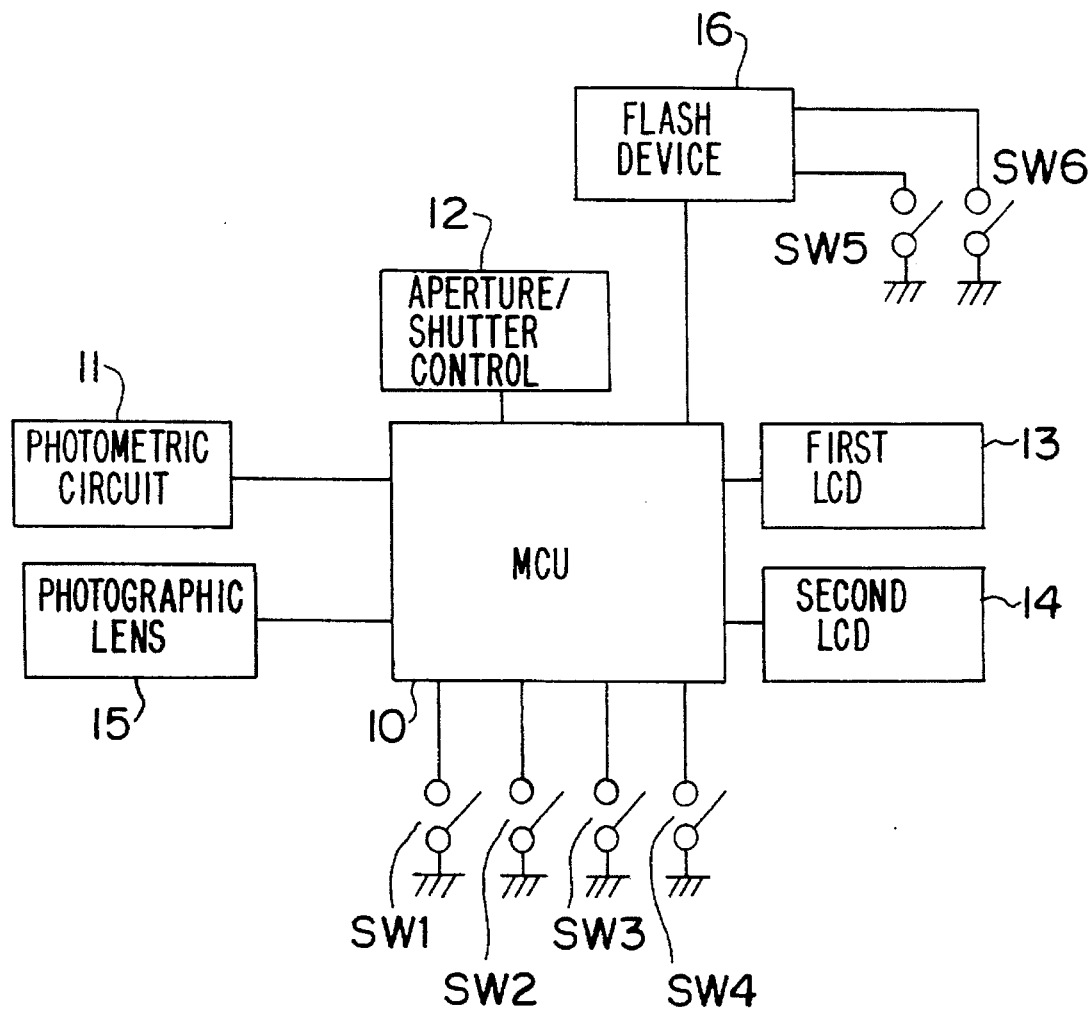
F I G. 1

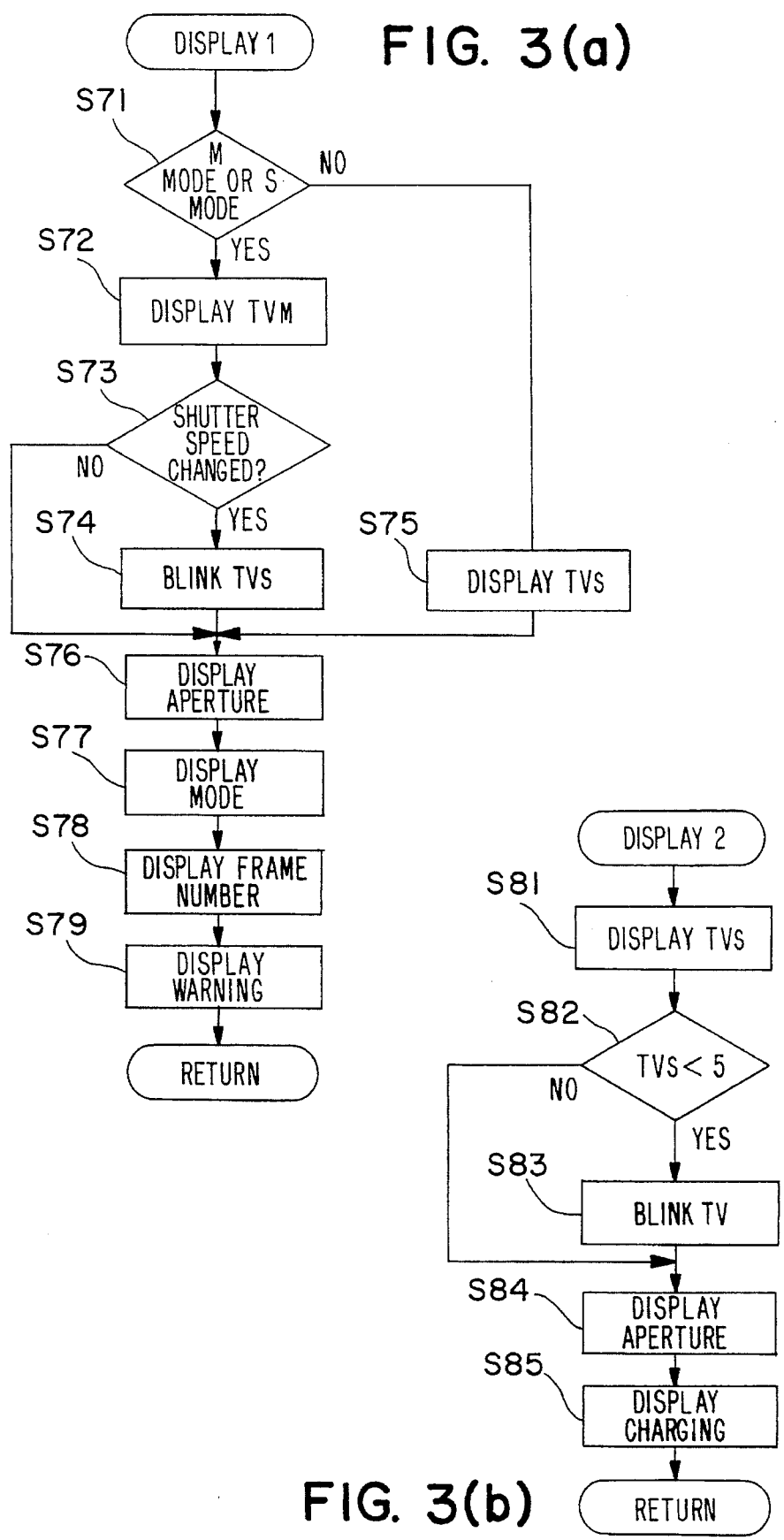

CAMERA WHICH SETS SHUTTER SPEED AND LIGHTS DISPLAY IN ACCORDANCE WITH FLASH DEVICE

BACKGROUND OF THE INVENTION

1. Field of the Invention

The present invention relates to an information setting device used to display various information in a camera during photography and, more particularly, to the setting of a camera shutter speed after a flash device has been mounted and to a display device indicating when the shutter speed is set to a speed that may be affected by camera shake.

2. Description of the Related Art

A conventional camera can set a variety of information during use, such as shutter speed, aperture value, and the like. Other information which may be set includes an exposure mode setting, a continuous or noncontinuous photography setting, a continuous or single autofocus drive setting, an exposure correction value and film sensitivity. If a flash device is mounted, information for flash or normal photography can be set.

One particular example of an information setting device in a camera is a shutter speed setting device. In such a shutter speed setting device, the shutter speed is automatically set according to the photometric output from a photometric circuit. Alternatively, a photographer may manually set the shutter speed by way of a manual operation according to the photographer's judgment and preferences.

However, when a flash device is mounted for flash photography, or when normal photography is desired and a flash device is mounted on the camera, the aforementioned shutter speed setting device is fixed to a synchronous speed. The synchronous speed corresponds to the speed of the flash device. Thus, in the prior art shutter speed device, when a flash device is mounted, the shutter speed is automatically limited by the synchronous speed - - - even though the shutter speed may be manually set to a higher speed than the synchronous speed.

The above-mentioned prior art shutter speed setting device presents a number of disadvantages which cannot be easily avoided. For instance, once the shutter speed is set the flash device is removed, and the power supply is turned off, the shutter speed becomes set to the synchronous speed. If, for example, the shutter speed is set to 1/1000 before a flash device is used, and subsequently a flash device requiring a corresponding shutter speed of 1/250 is used, the shutter speed is temporarily changed to 1/250. Subsequently, if an operator wishes to take a photograph without the use of the flash device, the shutter speed will remain set at 1/250. The shutter speed is not automatically reset to the desired speed of 1/1000.

Practically speaking, a photographer encounters the problem that when a flash device becomes necessary due to photographic environmental conditions, and even though the flash device is operated according to the photographer's wishes, the shutter speed becomes unnecessarily set to an undesirable setting for subsequent photographs.

Another problem and source of confusion for the photographer is the display associated with the shutter speed. There are many different display devices for cameras known in the art. A first type of display device is an external monitor display which is mounted on the top surface or back surface of a camera body. A second type of display device is an internal display within the viewfinder. The internal display device is arranged within the visual field frame of the viewfinder into which the photographer looks when photographing. In many cases, both the internal display device and the external display device are used simultaneously.

The display device, be it either internal or external, may display varying types of information such as exposure information of the exposure mode, shutter speed accompanying the photometry or manual setting, aperture value, exposure correction quantity setting, film sensitivity information, film frame number information, or, if a flash device is mounted, information indicating flash or normal photography.

In the above-mentioned types of display devices, it is also possible to display various warnings during photography with the camera. One such example of a warning display is a camera shake warning which warns the photographer that the shutter speed has reached the camera shake limit for image blur-free photography. In prior art devices, when the shutter speed is changed such that there is a risk of image blur due to camera shake, a shutter speed display in the display device or a dedicated warning display is caused to blink. This type of camera shake warning display is known to be present in either the external monitor display or the viewfinder display, as generally known from the art.

The photographer typically encounters various problems when making preparations for photography. In this regard, the photographer must perform various setting operations and may be required to perform these setting operations in a relatively dark area. In some cases, the shutter speed display is indicated by a display within the viewfinder and an external monitor display. Thus, when a camera shake warning is indicated, both displays blink in various places. This presents a source of confusion for the photographer.

The photographer may encounter a number of various displays and may become concerned over the number of blinking displays, thus providing a hinderance and distraction from other setting operations. For example, during preparation, the photographer may be required to mount a flash device, wherein the shutter speed is set in connection with the flash photography, thereby executing flash photography in accordance with this limited shutter speed. Further, during flash photography, the shutter speed display in either of the above-mentioned internal or external displays may be caused to blink, thus presenting added confusion to the photographer. Moreover, this type of display is identical to the above-mentioned warning display such that it can be incomprehensible for the photographer to discriminate between the various warnings. Accordingly, there is a need to adopt a camera shake warning display which is simple and does not present confusion to the photographer.

SUMMARY OF THE INVENTION

Accordingly, it is an object of the invention to provide a camera information setting device in which a shutter speed setting is temporarily set during flash photography and which automatically reverts to the original shutter speed without further operation from the photographer.

It is a further object of the invention to provide a camera shutter speed display device having a first display disposed within the viewfinder of the camera for displaying a warning if the camera shutter speed presents a risk of camera shake and a second display disposed externally to the camera for displaying a warning that a flash device will limit the set shutter speed of the camera.

Objects of the present invention are achieved by providing a camera including a removable flash device. A manual setting member performs a shutter speed setting which is then stored in a first memory unit. A first display unit and a second display unit display the shutter speed. A change unit determines the presence or absence of the flash device, performs a change of the shutter speed, and stores information to a second memory unit. When a change of the shutter speed is performed by the change unit, a shutter speed display is performed in the second display unit, based on the information stored in the second memory unit. Further, a shutter speed display is performed in the first display unit, based on the information which was stored in the first memory unit.

Objects of the present invention are also achieved by providing a camera shutter device having a shutter control switch for manually setting a shutter speed of the camera. A first memory unit stores the manual shutter speed which was manually set by the shutter control switch. A flash device is connected to the camera for transmitting an optical flash of predetermined length during a first state and not transmitting an optical flash during a second state. A determination unit determines the predetermined length of the optical flash and outputs a corresponding flash shutter speed. A second memory unit stores the flash shutter speed determined by the determination unit. A shutter control unit then selectively sets the shutter speed to the manual shutter speed during the first state of the flash device and the shutter speed to the flash shutter speed during the second state. A first display unit is connected to the first memory unit for displaying the manual shutter speed and a second display unit is connected to the second memory for displaying the flash shutter speed. The first display unit is located on the exterior of the camera body and the second display unit is located within the visual field of the viewfinder. Thus, when the flash shutter speed is stored in the second memory unit, a shutter speed display is caused to blink.

Moreover, objects of the present invention are achieved by providing a camera shutter device which cooperates with a removable flash device of a camera and which outputs a flash of predetermined length. The shutter device includes a manual switch for inputting a manual shutter speed into a first memory, a second memory for storing a flash shutter speed corresponding to the length of said flash, and a shutter control for setting a camera shutter speed to the flash shutter speed if the flash device is attached, and setting the camera shutter speed to the manual shutter speed if the flash device is removed.

Objects of the present invention are also achieved by providing a camera shutter device including an external monitor display unit, a viewfinder display unit, a determination unit for determining if the camera shutter speed presents a risk of image blur due to camera shake error, and a unit for blinking the viewfinder display unit upon risk of camera shake. A first detection unit determines if the camera shutter speed presents a risk of image blur due to camera shake and a second detection unit determines if a flash device is mounted on a camera and if the flash device will limit the manual shutter speed.

Further, objects of the present invention are achieved by providing a camera display device which displays a warning in a state easily understood by the photographer, which indicates that the shutter speed has exceeded the image blur limits due to camera shake, and also performs a simple display warning of the limitation of shutter speed which is set during flash photography. The display warning may be a visual indication such as a liquid crystal display or a light emitting diode. Preferably, the display warning is in the form of a blinking liquid crystal display.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 1 is a block diagram of a shutter speed device of a camera according to an embodiment of the present invention.

FIGS. 3(a) and 3(b) are flow charts illustrating subflow of a shutter speed setting device according an embodiment of the present invention.

DESCRIPTION OF THE PREFERRED EMBODIMENTS

Figure 2:
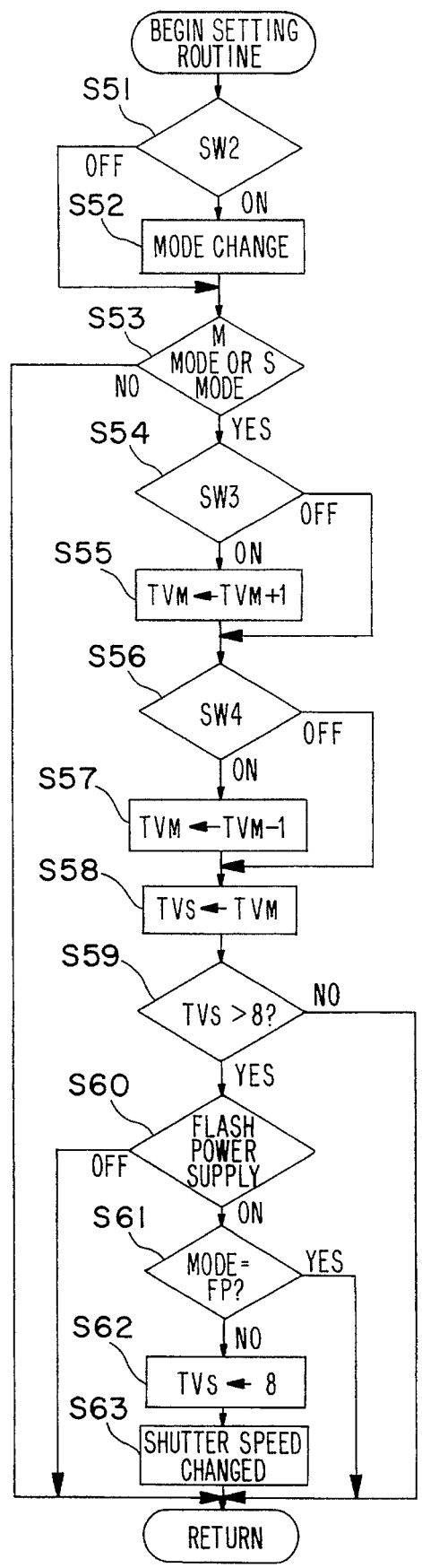
FIG. 2 is a flow chart illustrating the main flow of a shutter speed setting device according to an embodiment of the present invention.

Reference will now be made in detail to the preferred embodiments of the present invention, examples of which are illustrated in the accompanying drawings, where like reference numerals refer to like elements throughout.

With particular reference now to FIG. 1, an embodiment of an information setting device of a camera according to the present invention will be described. FIG. 1 is a block diagram of a shutter speed setting device for a camera. A microcomputer (MCU) 10 controls the operation of the shutter speed setting device.

Photometric circuit 11 is a photometric unit having a photometric output connected to an A/D converter input of the MCU 10. Aperture and shutter control circuit 12 is controlled by way of an output of the MCU 10.

LCD 13 is an external monitor or liquid crystal device which is a first display unit. LCD 13 is a display element which can be seen from the exterior of the camera (not shown), and is connected to a first LCD drive output element of the MCU 10. LCD 14 is an internal monitor within the viewfinder, which is a second display unit. LCD 14 is a display element which is visible within the visual field of the viewfinder, and is connected to a second LCD drive element of the MCU 10.

In FIG. 1, lens 15 is a photographic lens in a photographic optical system located in a lens barrel (not shown) of the camera. Lens 15 is configured such that the information of this lens is transmitted to the MCU 10. Switch SW1 in FIG. 1 is a release switch, and is normally OFF. When switch SW1 is turned ON, the shutter release sequence is initiated. Mode switch SW2 is also normally OFF. When mode switch SW2 is turned ON, the mode changes. Possible modes to be set by mode switch SW2 are manual mode (M mode), shutter priority mode (S mode), aperture priority mode (A mode), and program mode (P mode).

An "up" switch SW3 is operated when in the M mode or S mode to cause the shutter speed to change by one step in a direction of higher speed. Similarly, a "down" switch SW4 is operated when in the M mode or S mode to cause the shutter speed to change by one step in the direction of lower speed.

Flash device 16 is built into the camera body or connected externally thereto, and is electronically connected to MCU 10. Flash device 16 transmits power to the MCU 10 to turn it ON. Flash device 16 also indicates a charging end state, transmits a flash mode signal, and transmits and receives information to and from the microcomputer MCU 10.

Switch SW5 is a power supply switch of the flash device 16. Switch SW6 is a built-in flash device, and turns ON upon "pop-up" of the flash. Switch SW6 is a mode switch of the flash device 16, and is normally OFF. The first mode of flash device 16 is a normal flash mode. In this mode, the shutter speed and flash speed are synchronously performed within a short period of time. However, when switch SW6 is turned ON, there is a changeover to an FP light generation mode. In this mode, the flash time becomes long. This FP light generation mode has been adopted for the following reasons. In recent years, the blind speed of focal plane shutters has become very fast. For example flash photography is even possible at a shutter speed of 1/250. Nevertheless, when a shutter speed above this shutter speed is desired, a nonuniformity in the exposure light arises. As noted above, the shutter speed cannot be set above this synchronized speed. In this instance, the flash time is increased such that the flash time extends from the beginning of opening of the front shutter blind to the closing of the rear shutter blind. Thus, uniformity of exposure light is achieved even at high speeds. This is FP light generation.

By way of the present invention, the shutter speed may be set to 1/1000 before a flash device is used. When the flash device is used, the shutter speed is temporarily set to 1/250. The 1/1000 manual setting is automatically stored, even though the actual shutter speed is temporarily changed to a setting of 1/250, due to the flash device. If the flash device is removed, the shutter speed reverts to 1/1000, which is the previously set stored original shutter speed, without any further operation by the photographer.

FIGS. 2, 3(a) and 3(b) illustrate partial flow charts of the control by the MCU 10 during photography. They are described below with respect to the setting of the shutter speed which is related to the present invention, When power is supplied to the MCU 10, the photometric output from the photometric circuit 11 undergoes analog/digital (A/D) conversion. In addition, the states of switches SW1–SW4 are determined and the information from the flash device 16 is obtained. An exposure control quantity is also found, and its calculated result is displayed on the external monitor LCD 13 (first LCD) or the LCD used for display within the viewfinder, i.e., LCD 14 (second LCD). When the release switch SW1 is turned ON, control of the aperture or shutter is performed, based on the calculated result.

FIG. 2 illustrates the flowchart of the setting routine. In FIG. 2, step S51, it is determined whether switch SW2 is depressed. If switch SW2 is depressed or turned "ON", the routine proceeds to step S52. If switch SW2 is turned OFF, the routine proceeds to step S53. In step S52, a mode change process is performed. The mode register M0 of the MCU 10, as shown in FIG. 1, corresponds to each mode.

Namely, in step S52, by counting upwardly from the value in the mode register M0, the mode setting cycles from the P mode to the S mode, the S mode to the A mode, and the A mode to the M mode. If the mode setting is M, the next sequential value would be M0=4. However in this case M0=0 and the value changes over to the P mode. Table 1 below illustrates the mode register value and corresponding description.

TABLE 1

| M0 | Mode Resister |
|---|---|
| 0 | P: program mode |
| 1 | S: shutter priority mode |
| 2 | A: aperture priority mode |
| 3 | M: manual mode |

Next, in step S53, a determination of the mode register M0 is performed. If the mode register is the M mode or the S mode, the routine proceeds to step S54. If the mode register is neither the M mode nor the S mode, the routine returns to the calling process. In step S54, a determination is performed of whether the "up" switch SW3 is depressed. If switch SW3 is depressed, it is turned ON, and the routine proceeds to step S55. If switch SW3 is unchanged or OFF, the routine proceeds to step S56. In step S54, the set shutter speed value TVM is increased by one step. Next, if switch SW3 is turned ON or depressed, the routine proceeds to step S57. If switch SW3 is turned OFF or unchanged, the routine proceeds to step S58.

In step S57, the set shutter speed value TVM is changed one step lower. Then, in case the shutter speed is the low speed limit 30 (TVM=−5), the switch speed value is limited to TVM=−5. In step S58, the set shutter speed stored in the register TVM is transmitted to the register TVS for the controlled shutter speed value. This is because the determination of M mode or S mode is controlled by the set shutter speed. On the other hand in step S59, it is determined whether the controlled shutter speed value TVS exceeds "8". In case the shutter speed value exceeds "8", the routine proceeds to step S60, and if the shutter speed value is less than "8", the routine proceeds to "return".

In step S60, the ON/OFF status of the power supply for flash device 16 is investigated. If the power supply is turned ON, the routine proceeds to step S61, and if the power supply is turned OFF, the routine proceed to "return". In step S61 the flash mode of the flash device 16 is the FP mode. If the flash mode is in the FP mode, the routine proceeds to "return", and if not, the routine proceeds to step S62. In step S62, the controlled shutter speed TVS is limited to "8". Step S63 stores the status indicating that the control of the shutter speed has been changed.

FIG. 3(a) is a flow chart of a display routine 1 which drives LCD 13 for monitor display use. LCD 13 is the first LCD. In step S71, a determination is made of the contents of mode register M0. If the mode register M0 stores information corresponding to the M mode or the S mode, the routine proceeds to step S72. If mode register M0 is not set to the M mode or the S mode, the routine proceeds to step S75. In step S72, as shown by reference numeral 13a of FIG. 2, which is displayed in LCD 13 of FIG. 3 for external monitor display use, the display of a predetermined shutter speed value TVM is made.

In step S73 it is determined whether or not the shutter speed was changed in step S66. If the shutter speed was changed, the routine proceeds to step S74, and if not, the routine proceeds to step S76. In step S74, a value indicating the predetermined shutter speed is communicated to the photographer to provide a warning, and the routine proceeds to step S76. The communicated warning display may be a lighted display such as an LCD or an LED. The communicated warning is preferably a blinking LCD. Moreover, in step S75, as shown by reference numeral 13a in FIG. 4, the display of the controlled shutter speed value TVS is performed, and the routine proceeds to step S76.

In step S76, as shown by reference numeral 13b in FIG. 4, an aperture display corresponding to the selected mode is performed. In step S77, as shown by the reference numeral 13c in FIG. 4, a mode display is performed. In step S78, as shown by reference numeral 13d in FIG. 4, a display of the frame number is performed.

In step S79, a warning display is performed. Namely, if there is any state in the camera requiring a warning, a display corresponding to the content of the warning, not shown in the drawing, is performed in the space of LCD 13 of FIG. 4 for external monitor display use.

FIG. 3(b) is a flow chart of the second display routine which drives LCD 14. LCD 14 is the second LCD, for use in the display within the viewfinder. In step S81, as shown by the symbol 14a in the LCD display within the viewfinder 14 of FIG. 4, a display is set to display the controlled shutter speed value TVS. Then, in step S82, it is determined whether or not the controlled shutter speed value TVS is less than the camera shake limit speed of "5". If TVS is less than "5", the routine proceeds to step S83. If TVS is greater than "5", the routine proceeds to step S84. In S83, the controlled shutter speed warning display is set. The warning display may be a liquid crystal display or a light emitting diode. Preferably, the warning display is a blinking liquid crystal display.

On the other hand, when the controlled shutter speed value exceeds "5", the shutter speed value is set to blink in step S83 Of FIG. 3(b). Blinking occurs in the display 14a in LCD 14 within the viewfinder.

As set forth from the above description, the camera which is capable of flash photography by way of flash device 16 is equipped with an external monitor display 13 and a display 14 within the viewfinder, constituting display devices for displaying the shutter speed and the like. The shutter speed may also be manually set. When a state is detected in which there is a risk of camera shake, a display is caused to blink in the display 14 within the viewfinder. In this manner, even if a camera shake warning arises, the warning is only displayed in display 14 within the viewfinder. Thus, when performing the operations of photography, even in unexpected darkness, it is possible to perform other settings and operations, while avoiding confusion from this warning display. Accordingly, the warning display may be performed in a state which is easily comprehended by the photographer, when the limit of shutter speed relating to camera shake has been exceeded.

Moreover, in step S84, as shown by reference numeral 14b of FIG. 4, a display of the aperture is performed. In step S85, as shown by reference numeral 14c of FIG. 4, a charging display is performed. Namely, by way of information from the flash device 16, if the charging of the flash device is complete, the "ready" light of the flash device (14c of FIG. 4) lights up.

As discussed above, FIGS. 4(a), (b), (c) and (d) show examples of the displays of LCD 13 for external monitor display use and LCD 14 for display within the viewfinder, i.e., the first and second LCDs. The displays of LCD 13 and LCD 14 illustrate the shutter speed setting device according to the present invention. In this regard, symbol 18 in FIG. 4 denotes the visual field frame of the viewfinder.

Figure 4A:
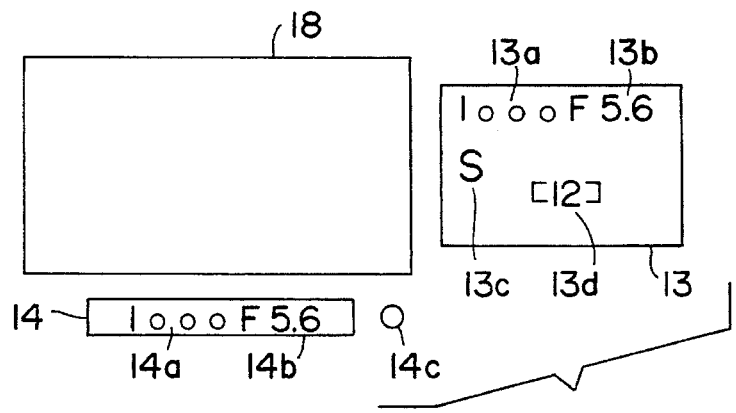
FIGS. 4(a)–4(d) are diagrams illustrating examples of an LCD display for internal and external use according an embodiment of the present invention.

FIG. 4(a) is an example of the display of a case in which there is a warning display or there is no change of the setting for the shutter speed. In case the power supply of the flash device 16 is OFF, or even if the power supply of the flash device 16 is ON, the flash device 16 remains in the FP mode, because the control change was not stored in step S63 (FIG. 2). As previously noted in step S74 of FIG. 3(a), blinking of the TV of LCD 13 for external monitor display use is not set, i.e., 13a does not blink. Moreover, in the case wherein the controlled shutter speed value is greater than "5", because the blinking of the shutter speed value is not performed in step S83, reference 14a in LCD 14 for display use within the viewfinder also does not blink.

Figure 4B:
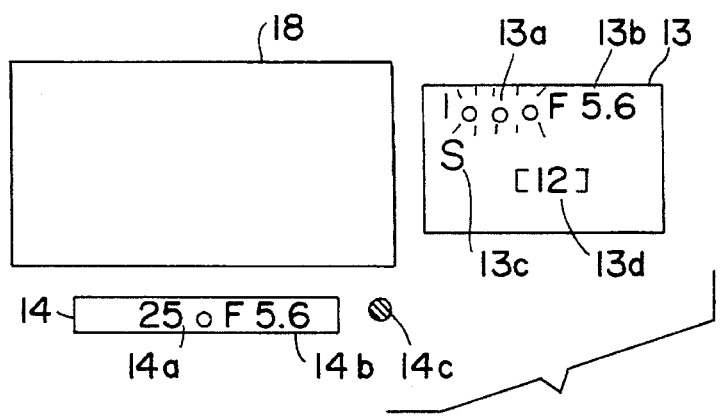

FIG. 4(b) is an example of a display wherein there is a change of the setting of the shutter speed. Namely, wherein the power supply of the flash device 16 is ON and the flash device is not in the FP mode, i.e., wherein M mode or S mode is set and the shutter speed TVM>8 (because the control change in step S63 of FIG. 2 is stored in step S74 of FIG. 3(a)), the blinking of the TV in LCD 13 for external monitor display use is set, and 13a blinks.

On the other hand, in the case wherein the controlled shutter speed value is greater than "5" (because the blinking of the shutter speed value is set in step S83 of FIG. 3(b)), reference 14a does not blink in LCD 14 for use within the viewfinder. For example, the value set in LCD 13 for external monitor display use becomes 1/1000, and because the controlled shutter speed becomes 1/250 on account of the power supply of the flash device 16 being ON, LCD 13 for external monitor display use blinks. However, the actual photography is being performed at 1/250, i.e., the normally expected operation. Thus, the display portion in LCD 13 for use within the viewfinder does not blink.

Moreover, when changing over to the FP light generation mode (causing the mode switch SW6 of the flash device 16 to be ON and proceeding to "return" from step S61 in FIG. 2) the control change of step S63 does not occur, and a value of "1000" does not occur in the display portion in LCD 13 for external monitor display use. Further, "1000" becomes displayed in the display portion of LCD 14 for use within the viewfinder.

Figure 4C:
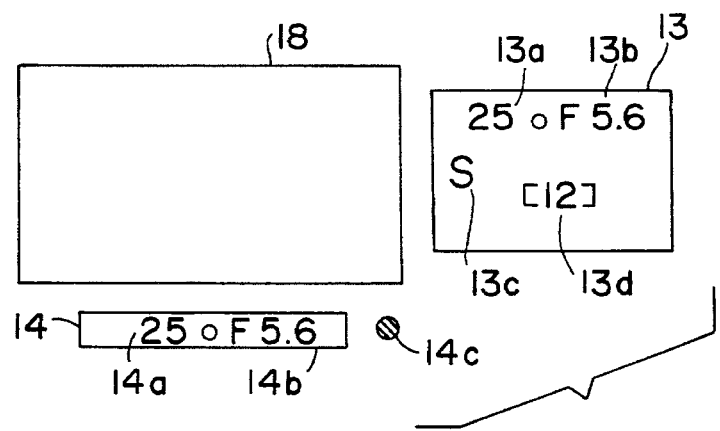

FIG. 4(c) is an example of the display in which TVM is made small, operating the "down" switch SW4 from the state of FIG. 4(b). Namely, in case the power supply of the flash device 16 is ON, the flash device 16 is not in the FP light generation mode, the predetermined shutter speed TVM<8 is in the M mode or the S mode, and the control change is not stored because of step S63 of FIG. 2 and step S74 of FIG. 3(a), the TV of the display portion of LCD 13 for external display use is not set to blink, and there is no blinking of 13a. This is because the set shutter speed and the controlled shutter speed are paired.

Figure 4D:
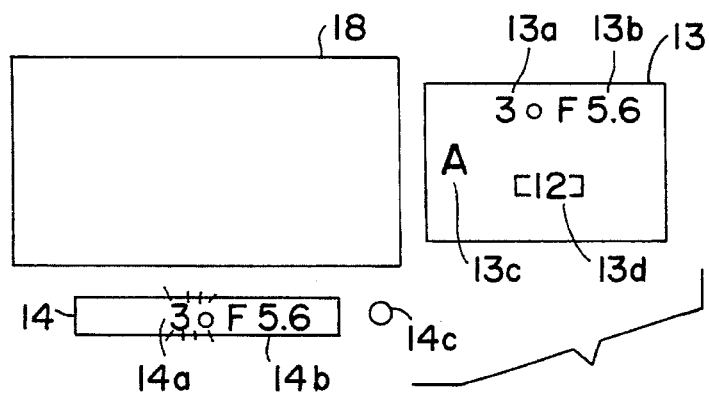

FIG. 4(d) is a display example of a camera shake warning display. Namely, in case the power supply of the flash device 16 is OFF (step S63 of FIG. 2), the control change is not stored (step S74 of FIG. 3(a)), and the TV of the display portion of LCD 13 for external display use is not set to blink. 13a does not blink. On the other hand, when the controlled shutter speed value is less than "5", the blinking of the shutter speed in step S83 of FIG. 3(b) is set, and 14a blinks in LCD 14 for use within the viewfinder.

From the above description, the setting device of the shutter speed of a camera, with which flash photography is possible by flash device 16, is equipped with the MCU 10. The MCU 10 performs a variety of operations including setting of the shutter speed, which is stored in a first memory unit (not shown in the drawing), and setting the "up" switch SW3 and the "down" switch SW4. MCU 10 also sets LCD 13 for external display use and LCD 14 for use within the viewfinder, which are the first and second LCDs, thereby displaying the shutter speed. A change unit (not shown in the drawing) in MCU 10 is stored in a second memory unit (not shown in the drawing) which determines the presence or absence, etc., of a camera flash by the flash device 16.

Then, when a change of the shutter speed has been performed by the change unit, the shutter speed based on the information stored in the second memory unit is displayed by LCD 14 for use within the viewfinder. However, the display of the shutter speed based on the information stored in the first memory unit is displayed by LCD 13 for external display use. By this arrangement, for example, if a 1/1000 shutter speed is manually set and the shutter speed has been temporarily set to 1/250 through use of flash device 16, the setting of 1/1000 is itself stored, and the temporary setting of 1/250 is changed over. If the flash device is not used, the setting becomes 1/1000, which is the stored original shutter speed, and the process reverts without further operation. In particular, when the simultaneous shutter speed is 1/125, the effective range becomes even wider.

Accordingly, with this particular arrangement, as in the case in which the flash device 16 is not in use after use of the flash device 16, the setting operation can be simplified by automatically performing a second setting operation to the range of shutter speed for normal use (which was a complicated operation for the photographer to perform).

The present invention thus provides, as shown in FIGS. 1–3, the external monitor display 13 and the display 14 within the viewfinder. The MCU 10 includes a first detection unit which determines the controlled shutter speed and detects a state of risk of camera shake, and a second detection unit which, determines the state of the flash device 16 and detects the state of limitation of the set shutter speed, as is shown in FIG. 4(a)–(d). Thus, only the display 14 within the viewfinder is caused to blink by the first detection unit, performing a warning that the shutter speed is in an image blur condition. Furthermore, only the external monitor display 13 is caused to blink by the second detection unit, performing a display relating to the functioning of the limitation to synchronous speed during flash photography.

According to the embodiment, the state of the flash device 16 is determined and a warning can be given of this state by the blinking of the external monitor display 13 that the shutter speed has been limited to a synchronous speed. The state of limitation is thus easily comprehended by the photographer. Even if the same shutter speed display blinks, because the displays 13 and 14 which blink are different, the difference is easily comprehended by the photographer, giving a suitable information display. The photographer can then easily discriminate the circumstances.

Moreover, the present invention is not limited to the structure of the above-mentioned embodiment example. Suitable modifications and changes may be effected to the configuration, structure, and the like of a camera equipped with the display devices 13 and 14, considering various examples of modifications.

In particular, in the above-mentioned embodiment example, only the characterizing features have been described, as the display device according to the present invention. Apart from these, the configuration may be that of a well known prior art camera, and the effects may be exhibited in various other cameras.

By way of the display device of a camera according to the present invention as described above, equipped with an external monitor display and a display within the viewfinder, determining the controlled shutter speed, the state of a risk of camera shake can be detected. Because the display is caused to blink only in the display within the viewfinder, in spite of the simple constitution, various superior effects are conferred as follows.

Even if there is a camera shake warning state, because the warning is in actuality only within the viewfinder into which the photographer looks, and even if there is an unexpected darkening tendency during the operations of preparing the camera for photography, other settings and operations can be performed, indifferent to this warning display.

Moreover, by way of the display device according to the present invention, an external monitor display and a display within the viewfinder, which can both display shutter speed, are equipped with a detection unit. During operation, the controlled shutter speed is determined and a state in which there is a risk of camera shake is determined. A second detection unit determines the state of the flash device and detects a state in which the shutter speed is limited. By way of the first detection unit, the display is caused to blink only in the display within the viewfinder. By way of the second detection unit, the display is caused to blink only in the external monitor display. Thus, in spite of a simple constitution, the various superior effects are conferred By way of the present invention, after determining the state of the flash device, when the shutter speed has been limited to the synchronous speed, a warning is displayed only in the external monitor display. The state in which the set value has been limited can thus be easily comprehended by the photographer. The part of the display which blinks is different. Thus, even if the same shutter speed display blinks, the photographer can easily comprehend the difference, and a suitable display of information can be performed.

In other words, by way of the present invention, by performing the blinking of the shutter speed display in either the viewfinder or in the external monitor, two kinds of warnings can be distinguished, which is superior from the aspect of utility. In particular, by way of the present invention, there are the advantages that a warning display of exceeding the camera shake limit relating to the shutter speed can be performed which is easily comprehended by the photographer. Furthermore, when flash photography is set, a display of the circumstances of limiting shutter speed to a synchronous speed can be performed.

Moreover, the present invention is not limited to the above-mentioned embodiments. The configuration, structure, and the like of each part of a camera equipped with the shutter speed setting device, suitably modified or changed, gives rise to various cases for modification.

In particular, in the above-mentioned embodiment, only the essentials characterizing the shutter speed setting device to which the present invention relates have been described, but the constitution apart from this may be a camera well known from the prior art, and it can be effectively inserted and applied in various cameras.

Although a few preferred embodiments of the present invention have been shown and described, it would be appreciated by those skilled in the art that changes may be made in these embodiments without departing from the principles and spirit of the invention, the scope of the which is defined in the claims and their equivalents.

What is claimed is:

1. A camera shutter device selectively cooperating with a flash device which is attachable to a camera and a self contained flash disposed within the camera which produces a flash for a predetermined time, wherein the camera has an external body, said camera shutter device comprising:

a manual switch which inputs a manual shutter speed;

a memory which stores a flash shutter speed corresponding to the predetermined time of the flash;

a shutter control unit, coupled to said manual switch and said memory, which sets a camera shutter speed to the flash shutter speed stored in said memory when the flash device is attached to the camera and to the manual shutter speed input by said manual switch when the flash device is not attached to the camera;

an external monitor display unit mounted on the external body of the camera;

a determination unit, coupled to said manual switch, which determines when the manual shutter speed input by said manual switch presents a risk of image blur; and a viewfinder display unit coupled to said determination unit and responsive to said determination unit to display a warning when said determination unit determines a risk of image blur.

2. A camera shake device as in claim 1, wherein said viewfinder display unit further comprises a lighting unit which blinks when said determination unit determines a risk of image blur.

3. A camera shake device as in claim 2, wherein said lighting unit is a liquid crystal display.

4. A camera shutter device selectively cooperating with a flash device which is attachable to a camera and a self contained flash disposed within the camera which produces a flash for a predetermined time, said camera shutter device comprising:

a manual switch which inputs a manual shutter speed;

a memory which stores a flash shutter speed corresponding to the predetermined time of the flash; and a shutter control unit, coupled to said manual switch and said memory, which sets a camera shutter speed to the flash shutter speed stored in said memory when the flash device is attached to the camera and to the manual shutter speed input by said manual switch when the flash device is not attached to the camera;

a first determination unit, coupled to said manual switch, which determines when the manual shutter speed input by said manual switch presents a risk of image blur; and a second determination unit which determines when a flash device is mounted on the camera and when the flash device will limit the manual shutter speed.

5. A camera shutter device as in claim 4, further comprising:

a viewfinder display unit coupled to said first determination unit and having a first lighting unit responsive to said first determination unit and providing a visual indication when said first determination unit determines that the manual shutter speed presents a risk of image blur; and an external monitor display unit coupled to said second determination unit and having a second lighting unit responsive to said second determination unit and providing visual indication when said second determination unit determines that the flash device will limit the manual shutter speed.

6. A camera shutter device as in claim 5, wherein said first lighting unit is a blinking liquid crystal display and said second lighting unit is a blinking liquid crystal display.

7. A camera shutter device as in claim 4, further comprising:

an external monitor display unit having a first lighting unit; and a viewfinder display unit having a second lighting unit;

wherein the first lighting unit blinks when the first determination unit determines that the manual shutter speed presents a risk of image blur, and the second lighting unit blinks when the second determination unit determines that a flash device will limit the manual shutter speed.

8. A camera shutter device as in claim 7, wherein said first lighting unit is a liquid crystal display and said second lighting unit is a liquid crystal display.

9. A shutter device for a camera having a camera body and used in conjunction with a flash device having a first state in which the flash device transmits an optical flash and a second state in which the flash device does not transmit an optical flash, said shutter device comprising:

a shutter control switch to manually set a shutter speed of the camera;

a first memory, coupled to said shutter control switch, which stores the manual shutter speed manually set by said shutter control switch;

a determination unit which determines a flash period from the flash device and produces a corresponding flash shutter speed;

a second memory, coupled to said determination unit, which stores the flash shutter speed produced by said determination unit;

a shutter control unit, coupled to said first and second memories, which sets the shutter speed to the manual shutter speed stored in said first memory when the flash device is in the first state and which sets the shutter speed to the flash shutter speed stored in said second memory when the flash device is in the second state;

a viewfinder having a visual field;

a first display, located on the camera exterior body and coupled to said first memory, which displays the manual shutter speed stored in said first memory; and a second display, located within the visual field of the viewfinder and connected to said second memory, which displays the flash shutter speed stored in said second memory.

10. A shutter device as in claim 9, further comprising a shutter speed warning display coupled to said second memory which blinks when the flash shutter speed stored in said second memory presents a risk of image blur due to camera shake.

11. A shutter device as in claim 9, further comprising:

an up switch for manually advancing the shutter speed one increment of higher speed; and a down switch for decreasing the shutter speed one increment of lower speed.

12. A shutter device of a camera which displays a warning based on whether a flash device is attached to the camera, said shutter device comprising:

a manual switch setting a shutter speed of the camera;

a first detection unit, coupled to said manual switch, detecting when the shutter speed indicates image blur resulting from vibration affecting the camera;

a second detection unit detecting when a flash device is mounted on the camera and detecting when the flash device will limit the set shutter speed;

a first display unit disposed within a viewfinder of the camera;

a second display unit disposed on a body of the camera; and a control unit, coupled to said first and second detection units and said first and second display units, which blinks said first display unit upon detection of a risk of image blur by said first detection unit and which blinks said second display unit when said second detection unit detects that use of the flash device will limit the shutter speed.

13. A shutter device as in claim 12, wherein said first display unit is a liquid crystal display and said second display unit is a liquid crystal display.

14. A camera shutter device as in claim 12, wherein the manual switch further comprises an up switch for manually advancing the shutter speed one increment of higher speed and a down switch for decreasing the shutter speed one increment of lower speed.

15. A camera shutter device cooperating with a flash device and producing a flash for a predetermined time, said camera shutter device comprising:

a manual switch which inputs a manual shutter speed;

a memory which stores a flash shutter speed corresponding to the predetermined time of the flash;

a first display unit disposed within a camera viewfinder;

a second display unit disposed on a camera body; and a shutter control unit, coupled to said manual switch and said memory, which sets a camera shutter speed to the flash shutter speed stored in said memory when the flash device is used and to the manual shutter speed input by said manual switch when the flash device is not used.

* * * * *